Feb. 6, 1923.
A. L. DUNCAN.
Fruit Knife.
Filed Nov. 10, 1922.
1,444,173
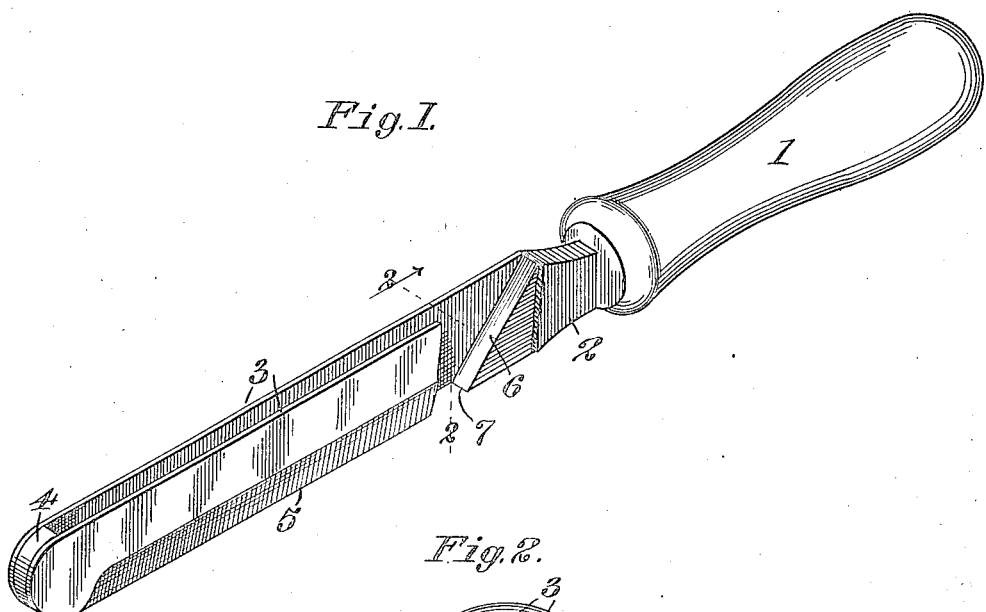
Fig. I.
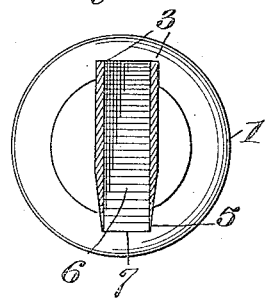
Fig. 2.
Inventor:
A. L. Duncan.
By Acken & Totten
Attorneys.

Patented Feb. 6, 1923.

1,444,173

UNITED STATES PATENT OFFICE.

ARTHUR L. DUNCAN, OF OAKLAND, CALIFORNIA, ASSIGNOR OF ONE-THIRD TO E. H. DUNCAN AND ONE-THIRD TO CHARLES E. FORRY, BOTH OF OAKLAND, CALIFORNIA.

FRUIT KNIFE.

Application filed November 10, 1922. Serial No. 600,142.

*To all whom it may concern:*

Be it known that I, ARTHUR L. DUNCAN, a citizen of the United States, residing at Oakland, in the county of Alameda and State of California, have invented certain new and useful Improvements in Fruit Knives, of which the following is a specification.

In preparing fruit, particularly peaches, for canning, it is the present custom to halve the fruit by cutting; remove the pit and then trim the cut surfaces to provide a smooth face to better present the fruit when the can is opened.

The cutting at the present time is accomplished by the ordinary paring or small knife, which leaves the fruit with a rough jagged edge when halved. The present invention relates to an improved form of knife for use in the halving of fruit, particularly peaches, and by the use of which a strip of the pulp is severed from the peel to the stone, enabling the easy grasping of the uniformly formed halves in their axial rotation in opposite directions to separate them from each other and one from the stone.

With the above mentioned and other objects in view, the invention consists in the novel construction and combination of parts hereinafter described, illustrated in the accompanying drawings and pointed out in the claims hereto appended; it being understood that various changes in the form, proportion, size and minor details of construction within the scope of the claims may be resorted to without departing from the spirit or sacrificing any of the advantages of the invention.

To more clearly comprehend the invention, reference is directed to the accompanying drawings, wherein:—

Fig. 1 is a view in side elevation, with one of the blades partly broken away.

Fig. 2 is a transverse sectional view taken on the line 2—2 of Fig. 1.

Referring more particularly to the drawings, wherein like numerals designate corresponding parts, 1 indicates a handle to which is secured the base 2 from which extend the blades arranged in parallel relation and united at their outer ends as at 4. The blades are provided on corresponding edges with the cutting edges 5, and the outer wall of the base 2 between the inner ends of the blades is inclined upwardly toward the back of the handle, as at 6, to provide an ejecting guide or runway for the fruit strip which is severed from the body as hereinafter described.

In use, the operator grasps the knife in one hand and the fruit in the other and either rotates the fruit toward the knife or causes the knife to travel in a contra-clockwise direction peripherally around the fruit. In the movement of the fruit or the knife, the same are pressed toward each other so that the cutting edges cut into the fruit to the stone. This cutting action causes the severing of the fruit pulp or body from the peel to the stone in parallel lines, and the movement of the fruit and knife relative to each other causes the portion or strip of fruit between the blades to be directed upwardly by the ejector 6 between the knife blades 2 and 3.

The ejector is positioned adjacent the handle 1, but it will be apparent that the same may be positioned at the outer end of the blades, in which case the fruit is rotated in an upward direction away from the operator.

The lower edge 7 of the inclined wall 6 forms a cutting blade or edge disposed transversely between the inner ends of the blades 3 at a point flush with the blade cutting edges whereby the inner surface of the strip formed by the cutting blades is cut adjacent the surface of the stone.

The fruit after being cut is separated from the stone in a manner described in a copending application entitled Method of preparing fruit for canning and bearing Serial No. 600,143, filed November 10, 1922. the present invention, however, relating only to the hand tool for carrying out said method invention. The strip of fruit pulp which is cut from the fruit by the blades 3 is not wasted as the same is utilized in canning what is termed "pie fruit", and said strip being of uniform thickness and comparatively thin, is particularly desirable for this purpose.

Having thus described my invention, what I claim as new and desire to secure by Letters Patent, is:

1. A fruit knife comprising a handle, a pair of blades extending therefrom in parallel relation and formed with cutting edges, and a fruit ejecting wall extending between said blades at their point of projection from said handle.

2. A fruit knife comprising a handle, a pair of blades extending therefrom in parallel relation, and a fruit ejecting wall disposed transversely between said blades and inclined upwardly from the cutting edges and rearwardly from the outer ends of said blades.

3. A fruit knife comprising a handle, a pair of blades extending therefrom in parallel relation and formed with cutting edges, and a fruit ejecting wall disposed transversely between said blades and at an incline to the perpendicular.

4. A fruit knife comprising a handle, a pair of blades extending therefrom in parallel relation and formed with cutting edges, and a fruit ejecting wall extending between the said blades at their point of projection from said handle, said wall being inclined upwardly and rearwardly from the cutting edges to the back of the knife.

5. A fruit knife comprising a handle, a pair of blades extending therefrom in parallel relation, united at their outer ends and formed with cutting edges and a fruit ejecting wall disposed transversely between the inner ends of said blade, said wall being upwardly inclined from the cutting edges of the blades toward their backs in the direction of the handle.

In testimony whereof I have signed my name to this specification.

ARTHUR L. DUNCAN.